United States Patent [19]
Barbour

[11] Patent Number: 5,652,617
[45] Date of Patent: Jul. 29, 1997

[54] SIDE SCAN DOWN HOLE VIDEO TOOL HAVING TWO CAMERA

[76] Inventor: Joel Barbour, 438 Calle San Pablo, Suite I, Camarillo, Calif. 93012

[21] Appl. No.: 656,601

[22] Filed: May 31, 1996

Related U.S. Application Data

[63] Continuation of Ser. No. 470,927, Jun. 6, 1995, abandoned.

[51] Int. Cl.$^6$ .................................................. H04N 7/18
[52] U.S. Cl. .............................................. 348/85; 367/35
[58] Field of Search ...................... 348/82, 85; 367/35, 367/25, 69, 71, 76, 86, 911; 33/304; 73/152.54; 346/33 WL; 364/422

[56] References Cited

U.S. PATENT DOCUMENTS

| Re. 31,074 | 11/1982 | Nolte . | |
|---|---|---|---|
| 2,632,801 | 3/1953 | Donaldson . | |
| 2,987,960 | 6/1961 | Sheldon . | |
| 3,199,613 | 8/1965 | Malott et al. . | |
| 3,614,891 | 10/1971 | Nolte . | |
| 3,761,186 | 9/1973 | Wason . | |
| 3,974,330 | 8/1976 | Askowith et al. | 358/100 |
| 3,984,627 | 10/1976 | Galerne | 358/100 |
| 4,331,975 | 5/1982 | Krawza et al. | 348/85 |
| 4,440,496 | 4/1984 | Milana . | |
| 4,463,378 | 7/1984 | Rambow | 358/100 |
| 4,504,857 | 3/1985 | Miller et al. | 358/100 |
| 4,532,545 | 7/1985 | Hanson . | |
| 4,557,598 | 12/1985 | Ono et al. . | |
| 4,727,859 | 3/1988 | Lia . | |
| 4,843,896 | 7/1989 | Napeloni et al. . | |
| 4,855,820 | 8/1989 | Barbour | 358/100 |
| 5,106,163 | 4/1992 | Fujiwara et al. . | |
| 5,134,471 | 7/1992 | Gendron et al. | 358/100 |
| 5,381,784 | 1/1995 | Adair . | |

OTHER PUBLICATIONS

Cyclops Electronic, Inc. flyer advertising "Crawler Camera CCTV Pipe Inspection System".
Rate Corporation brochure for "Flo-Max Television Inspection Systems".
Brochure for Videospection "Model 861 Color Borehole Video Camera System".
Brochure for Videotronics "Model 821 Color TV Camera Preliminary Specification".
Overby, W.K., Jr., et al., "Analysis of Natural Fractures Observed by Borehole Video Camera in a Horizonatal Well", Society of Petroleum Engineers, Jun. 1988, pp. 9–16.
Brochure for Southwest Research Institute "Borehole Television System for Gas Well Production Studies".
I.S. Inspection Services Ltd. "System Evaluation".

(List continued on next page.)

*Primary Examiner*—Victor R. Kostak
*Attorney, Agent, or Firm*—Michaelson & Wallace

[57] ABSTRACT

An apparatus and method of visually examining the sidewalls of a bore hole include a down hole video tool lowered into the bore hole by means of a cable and winch on the surface. The apparatus includes a wide angle end video camera positioned at the tip of a lower section and a rotatable side scan video camera mounted inboard from the end video camera. The end video provides a panorama view of a portion of the bore hole, and the side scan video camera provides a detailed close-up 360 degree view of a portion of the bore hole. An upper section houses a power supply/triplexer, a telemetry board, an FM modulator video amplifier transmission board, gyroscope data interface board, and a gyroscope for showing the directional orientation of either camera and apparatus in the bore hole. The gyroscope orientation and the visual image of the portion of the sidewall viewed is transmitted to a video display monitor in an equipment van on the surface. The image on the screen includes a directional reference point so that the direction of a portion of the sidewall being viewed can be ascertained. The camera images are recorded by a video cassette recorder for a permanent record of the visualization of the entire length of the bore hole. The tool is used to inspect exploratory bore holes, or bore holes previously encased by steel tubing to detect any leaks or other deterioration in the tubing system.

31 Claims, 6 Drawing Sheets

OTHER PUBLICATIONS

Brochure for Geo–Tec System "Geo–VISION".

Product Bulletin No. 2 for Solinst Canada Ltd. "Borehole Video Camera Systems".

Brochure for Pearpoint Inc. "Colour Flexiscan TV System".

The Eagle Has Landed brochure advertising "Eagle Eye System".

Brochure for Sub–Sea Suystems, Inc. "Borehole Television Camera".

SIDE SCAN DOWN HOLE VIDEO TOOL HAVING TWO CAMERA

CROSS REFERENCE TO RELATED APPLICATION

This is a continuation of application Ser. No. 08/470,927, filed Jun. 6, 1995, now abandoned.

BACKGROUND OF THE INVENTION

1. Field of the Invention

The present invention pertains to visual bore hole logging. The visual examination of the bore hole for casing damage and/or fracturing and sediment stratification may be made with a video camera lowered throughout the bore hole and a video monitor in conjunction with a video cassette recorder for visualizing and recording the wall of the bore hole.

2. Description of the Prior Art

A well or bore hole is an artificial excavation made to extract water, oil, gas, and other substances from the earth. There is also the boring and drilling of holes for exploration. Exploration holes are drilled to locate mineral deposits such as oil and gas, ground water, geothermal supplies, to check for the integrity for nuclear waste depositories, and also to determine potential landslides in an unstable environment. Closed circuit TV camera systems are known in the art for visually examining the walls of a given bore hole. Additionally, in large diameter bore holes, a trained geologist can be physically lowered into the hole with a light source to visually examine the stratification, fracturing and layering of the various geological formations down through which the bore hole penetrates. In small diameter holes, this type of examination is impossible. Accordingly, in smaller diameter holes visual wall examination must be made with a moving picture bore hole camera or with a closed circuit television video camera. Furthermore, the heat, vapors, and fluids encountered in many bore holes make it dangerous for a trained geologist to be lowered down into the hole regardless of the diameter of the bore hole. In these types of bore holes, the geologist cannot be used, and the down hole video camera and tool must be employed.

Additionally, the bore shaft itself made by the bore hole is often not in a vertical orientation and has a drift or deviation in azimuth from its true vertical. There are drift recorders which monitor and log the slanting or drifting of the bore hole from its true azimuth. Inclinometers are known which determine deviation as well as drift, for example, by photographing from a plumb bob position against a compass background.

Additionally, while in the process of drilling a well and/or installing the steel tubing or casing to reinforce the wall of the bore hole, occasionally because of cave-ins, sedimentation and the like, the equipment in the hole becomes lodged and stuck therein. It then becomes a matter of locating the stuck pipe or other equipment in the wells. U.S. Pat. No. 2,817,808 issued to Giske, describes a method and apparatus for locating stuck pipe in wells.

After the steel casing or tubing has been in place for sometime in a well such as a ground water well, rusting and other shifts in the earth occasionally will cause rupturing or uncoupling of the steel casing. In this event, visual examination of the casing is necessary to see the extent of the break or leak and the feasibility of repairs.

Accordingly, the visual examination of the walls of a well are frequently needed when applied to the above problems.

SUMMARY AND OPERATION OF THE INVENTION

U.S. Pat. No. 4,855,820, issued on Aug. 8, 1989 to the present inventor, Joel Barbour, discloses an apparatus and method for visually examining the sidewalls of a bore hole. It includes a down hole video tool lowered into the bore hole by means of a cable and winch on the surface. The apparatus in U.S. Pat. No. 4,855,820 includes a wide angle video camera sealed and enclosed in its lower section. An upper section houses a power supply/triplexer, a telemetry board, an FM modulator video amplifier transmission board, gyro data interface board and a gyroscope for showing the directional orientation of the camera and apparatus in the bore hole. The gyroscope orientation and the visual image of the portion of the sidewall viewed is transmitted to a video display monitor in an equipment van on the surface. The image on the screen includes a directional reference point so that the direction of a portion of the sidewall being viewed can be ascertained. The camera images are recorded by a video cassette recorder for a permanent record of the visualization of the entire length of the bore hole. Various geological data can be extrapolated by this visualization by means of the observed and measured fracturing and stratification, which may be observed in a given bore hole. Additionally, the probe can be used to inspect bore holes previously encased by steel tubing to detect any leaks or other deterioration in the tubing or casing system.

The present invention is an improvement over the apparatus disclosed in U.S. Pat. No. 4,855,820. The present invention consists of a down hole video tool which includes an elongate, single section or two section cylindrical housing, which is lowered into the bore hole. The lower end of the tool houses a video camera, a wide angle video camera lens and a light source extending a few feet in front of the lens or around the lens to illuminate the dark interior of the bore hole. The lower portion of the tool also houses a second video camera, a narrow camera lens with a reflective mirror, or a periscope-shaped lens, and a light source positioned about 12 inches inboard from the probe end mounted wide angle camera. The second video camera is referred to as a side scan video camera. It is used to observe and record the walls of the bore hole adjacent to the side scan lens. There is a cut away area in the sidewall of the housing where the second light source is mounted, and a 45 degree angled mirror is also mounted in the cut away portion. The video camera and lens is positioned and sealed in the pressure housing so that the video camera lens faces the angled mirror. The reflected images of the bore hole on the mirror are picked up by the side scan video camera and transmitted to the surface. The mirror and cover for the light source are exposed to the elements. Everything else is contained within the pressure housing that protects the internal components from the high pressures, caustic fluids, vapors, and temperatures encountered at deeper depths in many bore holes. The side scan video camera is used to closely observe anomalies in the wall of the bore hole initially seen by the wide angle camera and lens at the lower probe tip of the tool.

Support equipment is located above ground, which includes a winch having a cable attached to the upper end of the tool to lower and retrieve the tool in the bore hole. The cable includes a bidirectional data transmitting cable and also an electric cable for providing a power supply to the tool itself. Typically, the winch is installed in a large equipment van used to transport the down hole video tool. Inside the van is a variety of support equipment including a television video monitor, a video cassette recorder, a video printer, telemetry equipment and a computer. A depth measuring device to indicate the position of the tool in the ground, and a temperature sensor to measure the ambient temperature at the location of the tool are also part of the equipment.

The down hole video tool has a leakproof, pressure, and temperature resistant housing which houses the end and side video cameras, the end and side light sources, a bidirectional telemetry circuit board for handling and processing the signals for transmission up to the television/video monitor above ground, video amplification means of the signals, a power supply/triplexer, and a gyro and/or inclinometer.

As the down hole video tool is traversed down hole through the bore hole, it is impossible to keep the camera and tool oriented in the same direction it was in when it was initially lowered into the bore hole. Unless restrained, there will always be a twisting or rotational effect by the down hole video tool to some extent as it twists on the supporting cable. As a result, the operator does not know the direction of a side of the wall being visualized on the video monitor by means of the images telemetered from either video camera in the hole. He is unable to tell the orientation or directional bearing of the camera in the hole, i.e., the operator cannot determine the north, south, east or west side of the bore hole displayed on the video monitor.

The present invention has been improved over the tool disclosed in U.S. Pat. No. 4,855,820. The present invention has an upper centralizer and a lower centralizer each spaced apart and mounted around the circumference of the tool. Both centralizers can be adjusted to fit the diameter of a particular bore hole to be logged. Both centralizers keep the tool centrally positioned in the bore hole. The centralizers prevent or limit the tool from rotating about the support cable while in the bore hole.

The term "tool" collectively refers to the support cable, cable head, and the two-section housing in which the electronics, the gyroscope and both cameras are mounted. The present invention also includes a means to rotate the lower portion of the tool to allow the side scan video camera to take a panorama view of the portion of the bore hole adjacent to the side scan video camera. The cable head section attached to the lower portion of the tool has the upper centralizer surrounding the cable and rotary driver motor mounted inside of it. The rotary driver has a coupler extending from the bottom of the cable head section so that the remainder of the tool with both video cameras can be demountably coupled to the rotary driver and cable section or assembly. The lower centralizer is bearing mounted around the lower portion of the tool. The lower centralizer allows the lower portion of the tool to rotate even when the lower centralizer is kept stationary and touching the wall of the bore hole to center the tool in the bore hole. The rotary driver in the cable section can be energized to cause the lower portion of the tool attached to it to rotate very slowly to allow the side scan camera to sweep the circumference of the side wall. The rotary driver can also be used to rotate the tool to position the side scan video at the fracture or break that needs to be closely observed. The rotary driver is a DC motor and is geared down so that it rotates the rest of the tool very slowly. Additionally, the coupler and driver are sealed in the upper portion to prevent damage from high pressures and caustic fluids. The upper portion with the driver does not rotate in the hole, because the upper centralizer prevents the upper portion from turning. The entire lower portion of the tool containing the gyroscope and video cameras turns as a unit when using the side scan video. Both centralizers are adjustable so that they can be expanded or contracted to fit into various sized bore holes. The cage-like centralizers can also be equipped with coil type expanders so that the centralizers can expand and contract in the bore hole to allow for changing diameters in the bore hole while conducting the down hole operation. In normal circumstances, the diameter is already known before hand. In that case, the centralizers are adjusted for that particular diameter before the operation begins.

In normal operation, the tool is lowered down hole through the bore hole to be logged or surveyed. Only the wide angle lens video camera and light source at the bottom probe tip of the tool are turned on and viewing the bore hole down hole as the tool passes through the bore hole. The two centralizers will prevent the tool from twisting on the cable while it is lowered down the bore hole. The tool will make only perhaps one or two rotations in a 2,000 foot bore hole. The centralizers prevent the tool from rotating in the bore hole. This eliminates the torquing on the cable by the tool.

The present invention incorporates a built-in free gyroscope in the housing of the tool. The gyroscope is about one and one-half inches in diameter and is arbitrarily selected to point north and then is "locked in" to always point north. The probe and cameras as part of the down hole video tool can rotate on the cable as a unit, but the spin axis of the gyro remains fixed in space. A reference point generated by the free gyro is displayed on the video screen to always indicate the directional orientation of the sides of the wall of the hole. The visual display on the video monitor screen will probably show the directional reference point drifting or floating around on the screen as the wide angle video camera in the housing rotates back and forth in the bore hole. Both video cameras are stationary in the tool. Directional orientation of either camera is indicated by the signal generated by the built-in gyro. The gyro generates a real time image dot displayed on the video screen above ground. The image dot is self-correcting to constantly show target heading of the camera, for directional reference of fractures, bed dip, casing damage or other objects being viewed by either the side scan video camera or the wide angle lens camera. The side scan video camera provides a close image of the side wall compared to the image generated by the wide angle lens. The user can get infinitely greater detail on fractures and bedding dips as the tool, with the side scan video, passes by. The user can get very precise measurements between the top and bottom of the bed dip or fracture, and the direction either one is lying along. Additionally, the side scan video camera is able to show the aperture of the particular fracture.

The greater resolution of the break in a casing in a bore hole provided by the side scan video camera allows the user to give a more informed opinion on the extent of damage to the casing, whether it is repairable, and how best to repair the fracture or break. The side scan video camera image on the video monitor above ground has a floating directional reference point displayed. The reference point is displayed and interpreted somewhat differently from the reference point displayed on the monitor from the wide angle lens, because only about 50 degrees of the side wall is visible at a time in the image and because the image shows the side wall from a horizontal perspective rather than from a vertical head-first perspective. The dot indicates the direction of the portion of the side wall being viewed. The top of the screen is north, the bottom of the screen is south, the left of the screen is west, and the right of the screen is east. The rectangular video screen should be viewed as if it were a 360 degree compass, with 12 o'clock, being due north, 3 o'clock being due east, 6 o'clock being due south, and 9 o'clock being due west. The directional reference point will change position in a circle fashion as the tool is rotated by the operator above ground. The dot will move to correspond with the imaginary clock positions. For example, if the dot is at the bottom of the video screen, the image on the screen shows the due south portion of the side wall. The gyroscope and the side scan video camera move together. They are synchronized with each other.

Video logs for the bore hole video examination are visually recorded on three-quarter inch video cassettes for a permanent record. These may then be copied onto VHS, Beta, or other formats for convenience. Also available in the equipment van are hard copies of video images produced by a video printer for immediate presentation, and a video typewriter for recorded commentary. The commentary is recorded on the videotape. The orientation has applications to show hard rock fracture sizing and orientation. For example, the layer of the fracturing can be visually observed and measured by the image on the video screen. If the fracture is inclined, then the angle of inclination can also be extrapolated by a standard trigonometric function by knowing the diameter of the bore, and the difference in height between the top of the fracture at one side of the bore hole and the top of the fracture at the opposite side of the bore hole. The difference in height would form the vertical leg of a right triangle and the diameter would be the horizontal leg of the right triangle. These two numbers could be used to calculate the tangent to find the angle of inclination of the fracture at that particular depth. The reference point showing the true north on the video display monitor would also show the direction of the slope of the fracture line, or bed dip.

The above ground winch which lowers the cable down hole into the well bore hole has an optical encoder and a calibrated wheel on the winch. This measuring equipment displays on the video monitor the depth of the tool within a tenth of a foot or even less. The depth measurements, or differences in the depth measurements can be made precisely using the side scan video. For example, in an average 8 inch diameter hole, the difference in height in the top of the fracture on opposite sides of the hole is three to eight inches. This can easily be determined by looking at the depth reading presented on the video screen at the top of the fracture while the tool is being lowered to the top of the fracture on the other side of the hole and noting or reading the difference in the depth, usually in inches, as shown on the visual display. The image generated by the side scan a video immediately indicates on the screen the compass direction of the fracture. The video camera can be rotated to show the opposite side of the fracture. One can raise or lower the tool to measure or calculate the height difference of the fracture. The sloping direction requires two compass readings; one at the top of the fracture having the shallower depth, and the other at the top of the same fracture having the deeper depth.

One could drill an array of exploration bore holes in a given surface area and then map the fractures and stratifications of the underground formations to determine the geological makeup of that given area. In the event where the bore holes are slightly inclined, then the readings from a previously inserted inclinometer could be used as a factor to determine the true angle of inclination of the layers. Or an inclinometer could be used by attaching it to the tool so that all readings could be taken simultaneously.

Accordingly, it is an object of this invention to have a down hole video tool for down hole passing through the length of a drilled bore hole, and having a wide angle video camera mounted at the probe tip of the tool for visually observing the walls of the bore hole, and a second side mounted video camera for close-up inspection of a portion of the side wall. Both are used in conjunction with a gyroscope in the tool so that the compass directional orientation of either the camera lens will be known when the data is telemetered up to the video screen monitor in the equipment van. One sees a directional reference point on the video monitor screen to determine the directional orientation shown of the bore hole walls when viewed on the video monitor. The directional reference point provides further data so that one can observe and calculate the rising or dropping angle of any fragmentation, bed dip, or layered rock in the bore hole. The directional indicator also informs one of the direction of leakage in a cased bore hole. The side scan video camera provides precise information about the anomalies usually encountered in the walls of a typical bore hole. The side scan can precisely measure bed dip.

It is an additional object of this invention to provide a down hole video tool that can be rotated at a given location in a bore hole to allow a side mounted video camera to take a panorama view of a section of the side wall, and also to orient the side scan video camera directly at an anomaly in the side wall of the bore hole.

It is a further object of this invention to provide a down hole video tool having a pair of centralizers for centering the tool in the bore hole and for preventing the tool from rotating while in the hole. The lower portion of the tool can be rotated by a rotary driver mounted in the cable head when using the side scan video camera. The tool includes a video camera with wide angle lens in a cylindrical housing forming the lower head section, and an upper section including a cylindrical housing for a power supply/triplexer to power the components, a free gyroscope to indicate the designated reference point of the camera lens, a means for video transmission of the data up to the video display monitor and a telemetry board for handling all of the data inputs and power sources to bidirectionally transmit the data to the surface. These are part of the second section of the tool.

DETAILED DESCRIPTION OF THE PREFERRED EMBODIMENT

Figure 1:
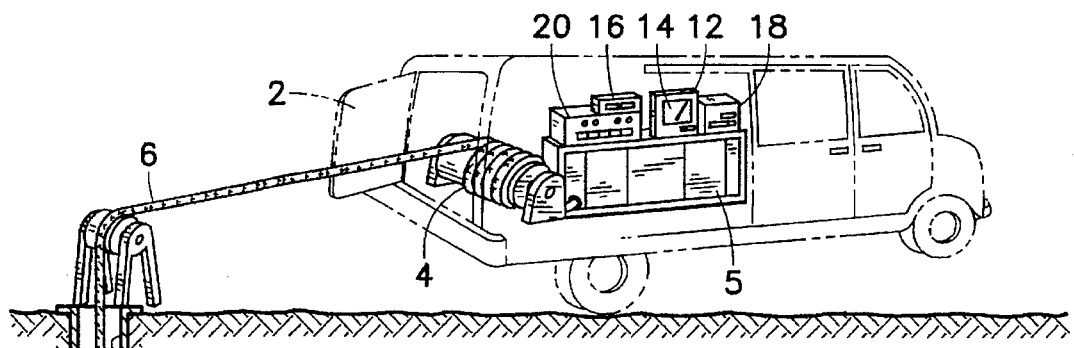
FIG. 1 shows the schematic figure of the equipment van stationed above ground and feeding the side scan down hole video tool into the bore hole by means of a winch. The bore hole having a casing is schematically shown in cross section with a fracture in the casing.

Referring now to FIG. 1, there is disclosed in phantom lines the equipment van 2, which is used to store and transport the equipment to the job site. The van equipment includes a winch 4, which has a cable 6 attached to the down hole video tool 8, which is shown inside the bore hole 10. The bore hole to be visually monitored can be any hole previously excavated or drilled. The instrumentation inside the equipment van includes a video monitor 12 having a rectangular display screen 14, a video cassette recorder 16, a video printer 18 and a telemetry key board video typewriter 20. The cable 4 and cable head 3 serve several purposes: for example, (1) to raise and lower the video tool 8; (2) to connect the tool 8 with the instrument panel 5 to bidirectionally relay the video transmissions by means of a coaxial cable or fiber optic cable, and (3) to provide a cable to supply electricity to the tool. The down hole video tool generally has an upper section and a lower section, also referred as a second housing and a first housing respectively. The upper section 30, the second housing, houses the gyroscope 32, the gyroscope data interface 34, the power supply/triplexer board 36, the telemetry board 38, and the FM modulation amplifier video transmission board 40. The lower section 50, the first housing, houses the wide angle video camera 52, the wide angle lens 54, the light source 60, the side mounted video camera 200, the lens 210, the side light source 220, and various connecting cables 48.

The primary power supply is designed to accept wide ranging incoming DC voltage anywhere from 40 to 150 volts. It takes the incoming variable DC to the tool light sources. Either lamp 60 or 220 is capable of receiving 40 to 150 volts. There are also several regulated DC voltages to run both cameras; perhaps 20 volts to either camera. A camera and light switching means is illustrated in phantom lines in FIG. 8 as a switch 230 and 4 cables (not illustrated) with D connectors connected to both cameras and lights. The tool has the capability of having both lights and both cameras energized at the same time. However, the switch 230, allows the operator on the surface to turn off one camera and light and then turn on the other camera and light in order to minimize power consumption. The DC voltages also run the gyro, both cameras, VC handling, telemetry coordination and the plotting to the gyro. Either camera has a reliable bidirectional telemetry system. It is a microprocessor controlled system.

Attached to the head of the tool where the video camera is located is a light source 60 which shines and illuminates the sidewalls so that the video camera can pick up the light reflections from the sidewall as it is being passed down hole through the bore hole. The light source, if desired, could be circular and concentric with the camera lens. The images picked up by the video camera 52 are processed and fed through the electrical components inside the housings of the tool. The signal is passed to the surface by a conductor coaxial cable or fiber optic cable, which carries video and sub-carrier frequencies bidirectionally. It is also called a coaxial data transmission line. The electronic components in the second housing 30 section or compartment of the tool process and transmit bidirectionally a variety of electronic data.

The side mounted camera 200, like the camera 52, has its images processed and fed through the electrical components inside the housings of the tool. The signals are passed to the surface by a conductor coaxial cable or fiber optic cable 6.

There is a modular inclinometer available, which may be added to the gyroscope 32 inside the protective tube 33. The modular inclinometer can be coupled to the gyroscope so that both transmit data together. When the inclinometer is coupled to the gyroscope, it is not shown in the drawings, because it is contained within the protective tube 33.

Figure 5:
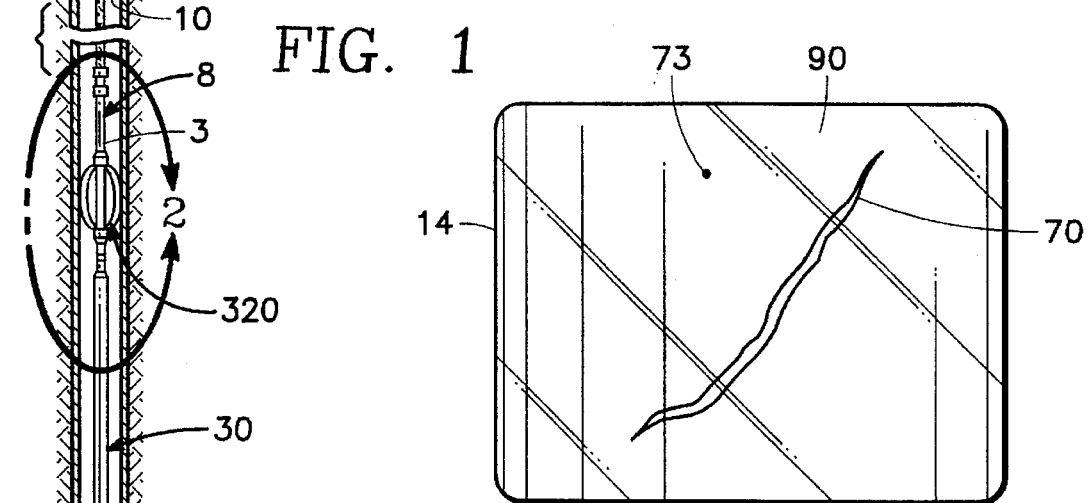
FIG. 5 illustrates a typical example of what is seen on the video screen of the monitor in the equipment van when the side scan video is transmitting images. The side scan camera is used to detect and observe fractures in the bore wall as illustrated in FIG. 5. The directional reference dot is also shown on the video display.
Figure 10:
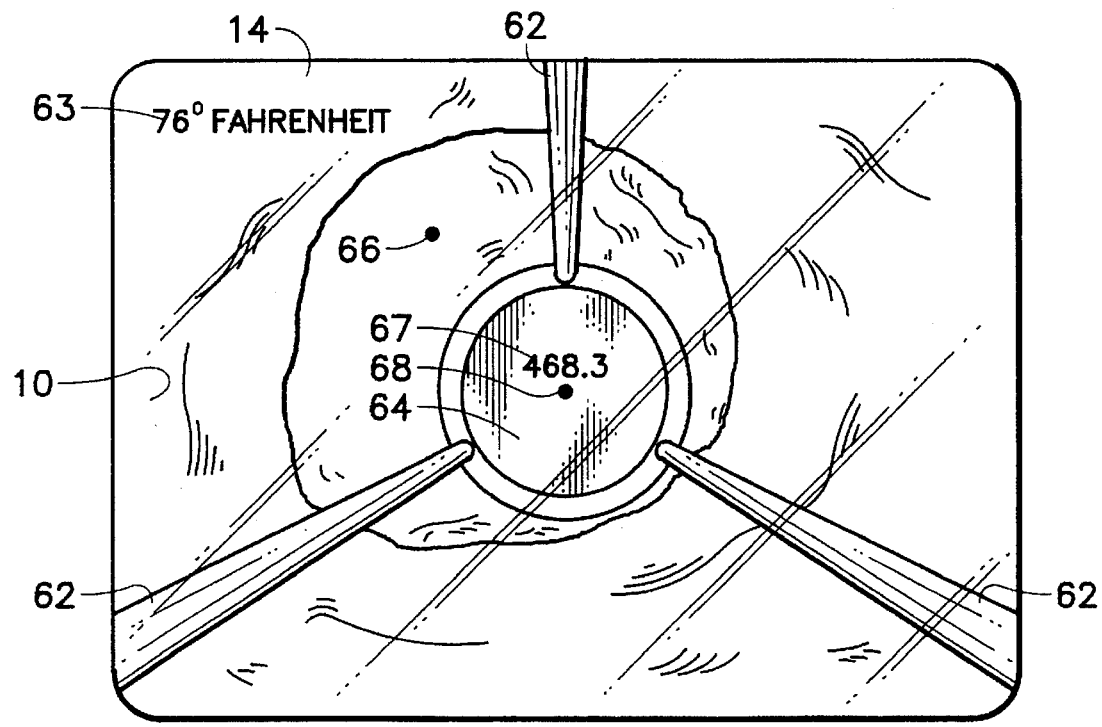
FIG. 10 illustrates a typical example of what is seen on the video screen of the monitor in the equipment van. There is shown visually the horizontal section of the wall of the bore hole at a particular location, the temperature at that particular location and the depth of the tool at that particular location. There is also shown the "floating" directional reference point showing the north direction of the wall at that location.

The gyroscope directional orientation is also incorporated in the signals transmitted from the tool to the equipment inside the equipment van. The end result is a video display 14 as illustrated in FIGS. 5 or 10. FIG. 10 shows what a typical visual display from the wide angle camera 52 looks like in actual operation. One sees the three prongs 62 and the backside ring 64 supporting the light source 60 positioned in front of the video camera 52 and camera wide angle lens 54.

Figure 4:
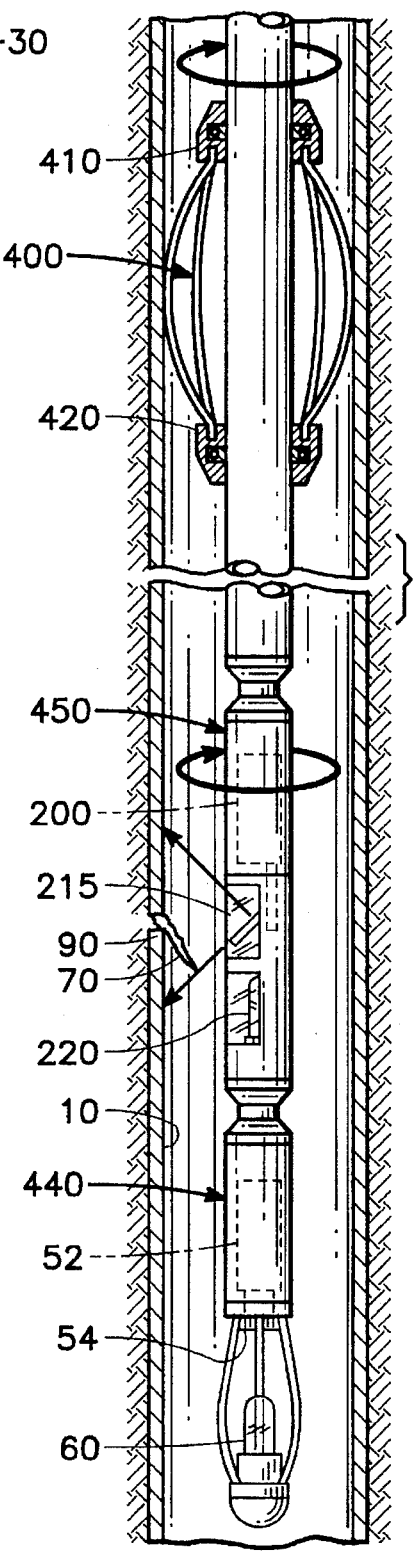
FIG. 4 is similar to FIG. 3 and illustrates the side scan video camera lens and light source in operation to visually examine the fracture found in a portion of the side wall at that particular location. It is transmitting the images to the display monitor in the van above ground while the lower section is being slowly rotated about its axis to position the side scan camera at the correct angular orientation for viewing the fracture head on. An angled mirror adjacent the video camera reflects images from the hole to the camera lens.
Figure 12:
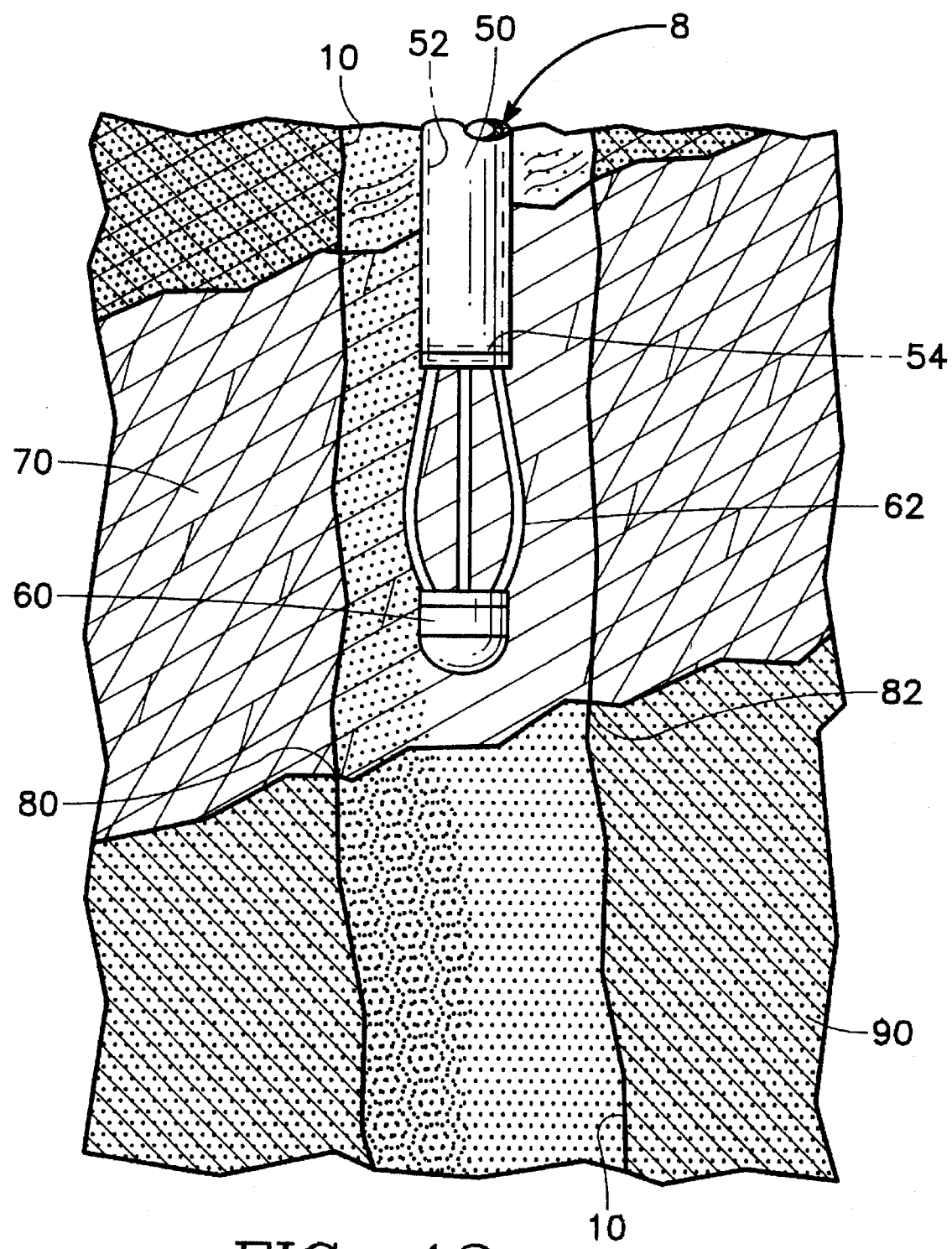
FIG. 12 is an enlarged fragmentary vertical cross section of the subsurface wherein the light source is shown ahead of the wide angle camera lens and in turn, the wall of the bore is being visually examined by means of viewing it on the display screen of the monitor in the equipment van. The video camera picks up the light reflections and transmits them via coaxial cable for display on the video screen monitor.

The lithography of the sidewalls of the bore hole 10 is readily apparent because the light source reflects light off the sidewalls which in turn is picked up by the camera. The wide angle video camera 52 shows a rectangular screen display as shown in FIG. 10 having a conventional scanning capability of approximately 270 horizontal lines on the screen. The video camera 52 remains stationary with the tool, i.e., if the entire video tool rotates or twists back and forth as it is being lowered into the bore hole, then the camera will rotate a like amount. It is usually impossible to prevent any twisting movement of the camera in this type of operation. As a result of the twisting and turning on the cable 6, the orientation of the camera 52 and lens 54 relative to the sidewall of the bore hole cannot be ascertained unless a directional reference point is created relative to the camera. This is accomplished by having a built-in gyroscope 32 inside the second housing comprising the upper section 30 of the tool so that even if the housing tool rotates by twisting on the cable, the spin axis of the gyroscope will still be aligned to a certain reference point which is usually arbitrarily selected as the true north. The north reference point can be seen in FIG. 10 as an off center dot 66. One can determine where the south side of the sidewall is by going 180 degrees from the true north reference point 66 displayed on the monitor. As the tool turns on the cable while it is being lowered in the hole, the reference point will move about or float on the video screen. However, everything is still relative to the reference point to the true north such that one can always determine the direction of a particular portion of the sidewall of the bore hole by means of the directional reference dot. The directional orientation is important in several matters especially when observing the fracturing and layering of the soils through which the bore hole is drilled. For example, FIG. 12 shows a cross-sectional view of a typical layered stratigraphic formation with a fracture in the subsurface area. As can be seen in FIG. 4, there is a fracture 70 and layering 90. The layering is inclined to indicate that the layering is not always horizontal but is quite often inclined or slanted as a bed or layering in the subsurface. The angle and direction of this angled fracturing or stratification can be calculated by taking data from the video screen as shown in FIG. 5 or FIG. 10. For example, the difference in the height of the fracturing can be observed on the display, which reads the depth of either camera in tenths of feet, and also how the orientation of the fracturing is slanted for example from north to south, or east to west. The difference in the height between the top 80 and 82 (FIG. 12) of a layer at opposite sides of the bore hole can be measured by taking the difference in the two depth readings on the display as either camera lens passes 80 and 82.

The side mounted video camera 200 allows for a very precise observation and measurement of the layering or fracture compared to the resolution available from the wide angle video camera 52. In normal operation, only the wide angle camera 52 and light source 60 is energized while surveying a bore hole. Fractures and bed dips will be picked up by the camera 52. If a particular fracture or anomaly needs to be examined in more detail, the side video camera 200 and light source 220 are switched on and the wide angle camera 52 and light 60 are switched off. The two camera lenses 210 and 54 are about 15 inches apart. The operator can observe the depth on the video screen in one-tenth inch increments where the wide angle lens is adjacent to the anomaly. The operator then further lowers the tool an additional 15 inches until the side scan lens is at the same depth as the anomaly to be viewed. The lens 210 of the side scan camera 200 has a fairly intense image. It has about a 50 degree field of view diagonally. Unless the lens is pointing directly at the anomaly, the tool has to be rotated until the lens is pointed directly at the anomaly. The is accomplished by the operator energizing the rotary driver 300 in the cable head assembly 3. The cable head assembly 3 remains stationary and will not rotate while in the bore hole, because the first centralizer 320 prevents the cable head assembly from rotating. Additionally, the second centralizer 400 surrounding the lower portion of the tool keeps the tool centered in the hole. The second centralizer has upper 410 and lower 420 sealed bearings to allow the tool to rotate while the second centralizer 400 remains stationary in the hole. The sealed bearings 410 and 420 are self-lubricating and are not subject to jamming or damage while in the bore hole. The rotary driver turns the tool counterclockwise until the lens is viewing the anomaly directly. The top of the second housing 30 has a coupler 27 that demountably couples to the end of the rotary drive 300. This connection has to be rotatable, but it must also be sealed tightly to prevent any leakage into the cable head 3 or the housing 30 from the environment usually encountered in the bore hole. The DC motor that turns the rotary driver 300 receives its DC power supply from the switche 230 in the housing 30. The switch 230 converts line power to DC voltage from 50 volts up to 150 volts. The operator can also raise or lower the tool to precisely measure the difference in heights of the slanting layer of the bed dip. The diameter of the hole and the difference in the height allows one to calculate the slope created by the hypotenuse of the right triangle to determine the inclination of that particular fault line. This can easily be calculated by using basic trigonometry or algebra to arrive at the angle of inclination or declination of that particular fault. By means of mapping vertically the series of layers and other geologic formations that are frequently encountered through a bore hole, one can create a geological profile of the type of rock formations in that particular area and at that particular hole. One can then drill an array of similar holes in that area and then by mapping the layering effects in the various holes, one could arrive at a geological profile of that given area by means of visualizing the various rock and sedimentary layers and also their inclination points. This is extremely useful in oil and gas exploration where the geologists are looking for synclines and anticlines, or dome shaped underground impermeable rock formations which are generally required in order to trap any possible oil and gas deposits so that they could be drilled at the apex of the dome of the anticline.

The visualization of the bore hole is quite useful when looking for geothermal deposits in the sense that the camera can visually observe the hole itself to see the type of layered rock formations and to observe the often sought-after information visually shown on the screen as shown in FIGS. 5 and 10. The upper left hand corner of the video display in FIG. 10 displays the degrees in Fahrenheit reading 63 where the tool is located. The tool has two built-in thermal sensors for continuous surface readout of tool and hole temperature. The pressure and temperature resistant housing comprising the tool has the ability to withstand heat up to 200 degrees Fahrenheit. However, when viewing a bore hole for potential geothermal use, the heat could damage the instrumentation in the housing. Accordingly, the temperature is used mainly as a safety factor to prevent damage to the video tool. As previously stated, the other set of numbers 67 shown on the video display screen in FIG. 10 indicates the depth in feet of the video tool.

Figure 2:
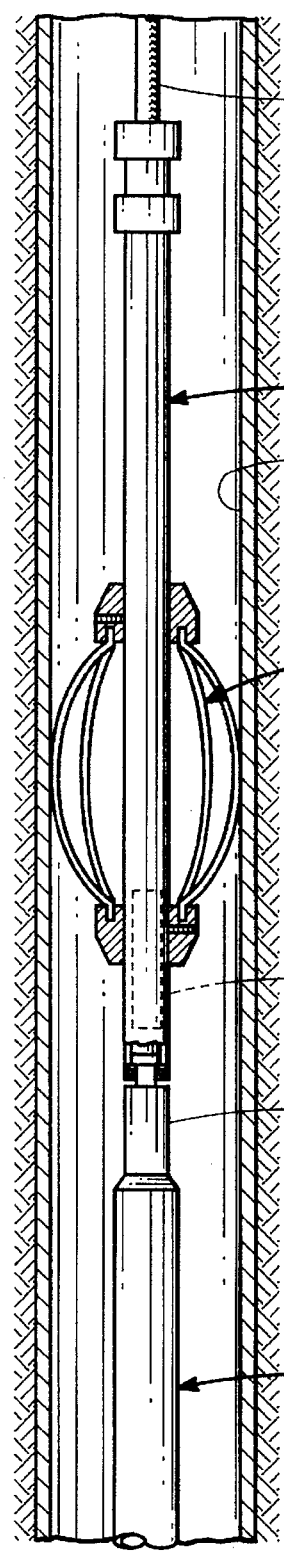
FIG. 2 is an enlarged view of the oval-shaped line 2 in FIG. 1 where the upper section is held stationary and centered in the bore hole by the upper centralizer, and the lower section is rotatably connected to the rotary driver in the upper section.
Figure 3:
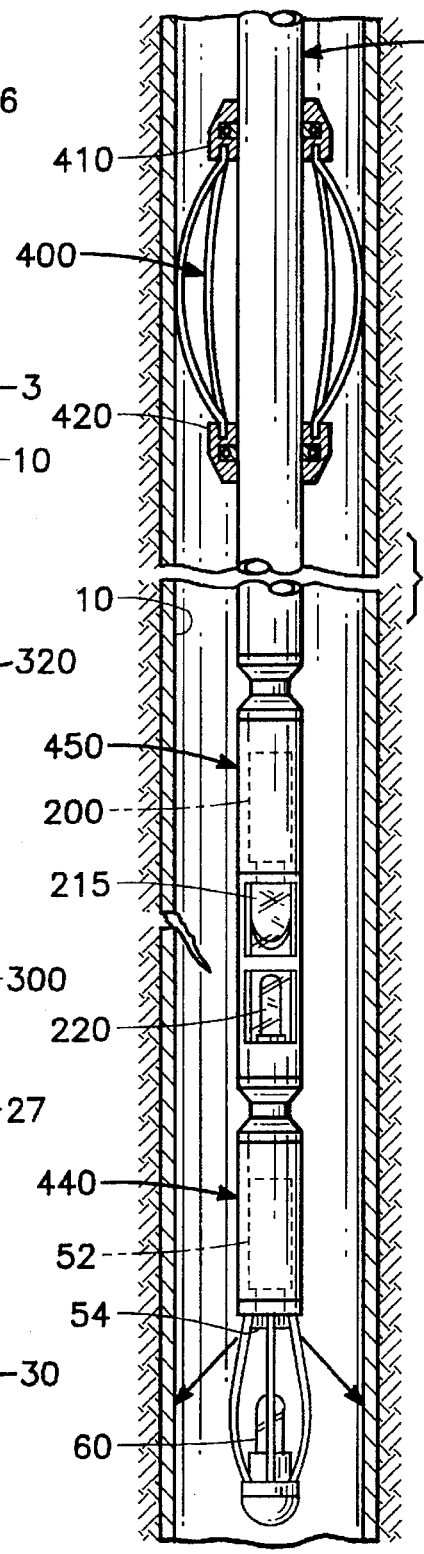
FIG. 3 is an enlarged view of the oval-shaped line 3 in FIG. 1 where the lower section is centered by the lower centralizer having sealed bearings for allowing the lower section to rotate, and the wide angle video camera lens and light source at the bottom tip of the tool is viewing the side wall at that place and is transmitting the images to the display monitor in the van above ground.

FIGS. 2-4 show a section of a bore hole. It is nearly impossible to drill a perfectly vertical hole because of the diverse geologic formations encountered by the drill bit. Occasionally the drill hole or the bore hole is intentionally slanted in a given direction to reach a proposed source of oil and the like. However, the slanting of the bore hole can be readily determined by instruments already known in the art. A typical instrument is known as an inclinometer (not shown) which indicates and records the orientation of the tool or drill away from the vertical. In one type of inclinometer this can be done by sequentially taking photographs of a plumb bob in conjunction with a compass. In that way, the angle of inclination and the direction of the deviation of the bore hole can be extrapolated in conjunction with the video display to accurately describe the deviation from vertical and the condition of the sidewall of the bore hole at any given location. However, the depth reading 67 is a function of the amount of cable let out from the surface. The deviations from the true vertical would create a longer length of cable than the true depth because of the deviation from the true vertical. This could be factored to subtract the reading of the depth of the tool to arrive at the depth of the tool in the true vertical should that number be required.

Figure 9:
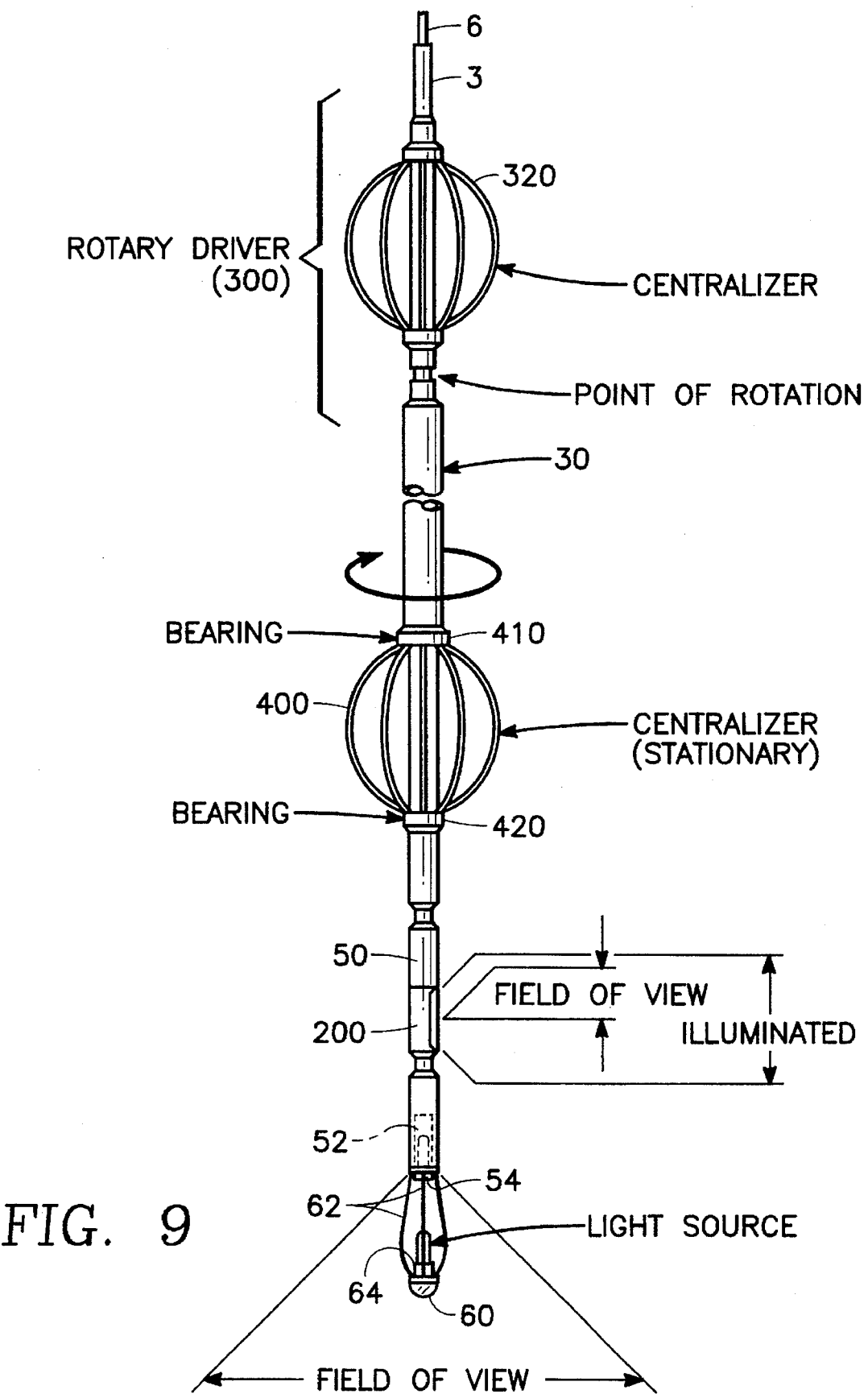
FIG. 9 illustrates the location of the two video cameras, the location of the two stationary centralizers, and the rotation of the coupled upper and lower sections relative to the stationary cable head assembly.
Figure 11:
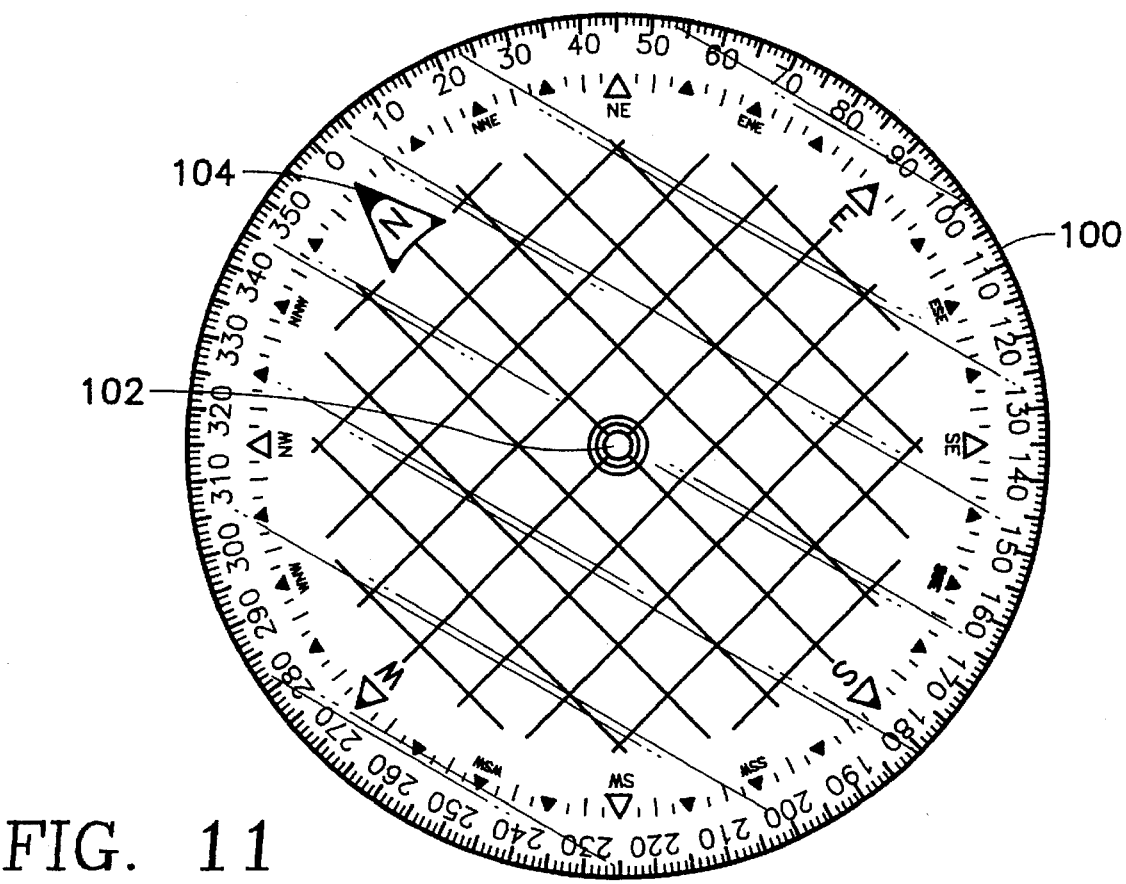
FIG. 11 is a acetate overlay which can be placed on the screen of the video monitor to find the direction of a section of the visualized wall relative to the directional reference dot shown on the video display.

FIG. 9 shows a situation where the bore hole is not truly vertical and this is evidenced by the center of the ring 64 for the light source not being in the center of the hole. This is only illustrated as an example of what is occasionally encountered in actual field conditions. One can quickly make a printed record at any given location of the tool by means of the video printer 18 connected to the video display monitor 12. Immediately, one can have a record of the bore hole at that particular location displayed on the screen 14. The master video log which is a video tape of the sidewalls along the entire length of the well bore hole examined, can be duplicated to have several copies made from the master video log for distribution to interested personnel for their evaluation and for their use of the data found by the video tool. One can take the acetate compass overlay 100 as shown in FIG. 11 and overlay it on the video display screen to quickly determine the true orientation of a particular section of the sidewall image shown on the video screen.

The center of the compass 102 (acetate overlay) is matched up with the dot 67 for the depth. The north arrow 104 is aligned with the north gyroscope dot 66 on the display 14. Now the directional bearings of the entire wall can readily be determined.

The two sections comprising the video tool, the second housing having the electronic components and gyroscope, and the first housing having the two cameras are coupled sections having interlocking pin 51 and hole 31 so that when they are connected together, the gyroscope will always be in the same orientation as the camera is. The upper and lower section of the tool can only be assembled or coupled in a preset configuration. When a job is initially begun, the gyroscope must be "zeroed" in to a fixed directional reference which is normally the true north. This is accomplished by having an assistant standing several hundred feet away with a survey sight line pointing to the true north and by means of a tripod or transit the true north is accurately determined. In turn, the gyroscope 32 which is caged in the housing 30 is adjusted so that its reference point 66 is set to the true north. The gyroscope in its uncaged position will always point to the true north even when the earth is rotating. It is a well known scientific principle that the axis of a free gyroscope will remain fixed with respect to space. When doing a well logging operation of a few hours the degree of offsetting of the true north from the gyroscope image on the video display is not important because of the minor change in orientation caused by the rotation of the Earth. However, where the operation takes several hours to do, the reference point 66 indicated as north on the video screen must be adjusted to compensate for the rotation of the earth. This has to be taken into consideration when the accuracy of the true north bearing is very important on a particular job.

When the tool is placed in the bore hole to be mapped or surveyed, the gyroscope 32 must first be zeroed in to the true or magnetic north. This is accomplished by performing the following sequential steps.

The gyroscope is energized for 5–10 minutes to allow it to come up to its operating speed of 40,000–50,000 RPM. The gyroscope is in a caged position, i.e., it is not free to float independently of the housing 30 in which it is contained. After the gyroscope has come up to operating speed, the down hole video tool 8 is placed in the bore hole 10. A surveyor's tripod or transit with a sight marker is placed as far away as possible, but at least 100 feet away from the bore hole and without any magnetic interferences. A sighting telescope (not shown) is demountably attached to the top of the end of the cable head 3. The telescope is sighted in with the sight marker and tripod or transit previously placed some distance away from the gyroscope. Usually, north will be the arbitrary directional reference point. However, east, west, south, or any direction could be used as a reference point if so desired. In this configuration there is a mark 7 or reference point on the outside cable head 3 indicating the north position for the gyroscope. The down hole video tool while hanging pendulant in the bore hole to be surveyed, is rotated until the north marker 70 on the outside of the housing comprising the cable head 3 aligns with the true north as sighted in with the sight marker. This can be accomplished by physically rotating the cable head which is interlocked with the attached tool so that the marker 7 aligns with the north according to the sighting with the tripod. When the mark 7 is aligned with the true north, there is a switch in the telemetry equipment 20 inside the equipment van which is switched on. This telemetry switch will uncage the gyroscope and allow it to float in a free position. The spin axis of the free gyroscope then will always point to the north direction. When the gyroscope is in the free-floating position it will always point towards north regardless of the rotation of the earth. This information is processed and displayed on the video display as the "floating" north directional reference dot 66.

During the switching on of the telemetry machine 20 to uncage the gyroscope to the free-floating position, the time is also entered into the telemetry equipment by means of the video keyboard. After the bore hole surveying has been completed, the tool is again pulled to the surface and the true north position of the marker on the housing indicating the direction of the gyroscope is again set and again entered into the telemetry equipment. The time of the day is also entered. In a surveying operation taking an hour or so, the drift caused by the rotation of the earth is negligible. However, in a more extended surveying operation extending over 3–4 hours, the drift could comprise 3–4 degrees drift. This drift caused by the earth's rotation will then be entered into the telemetry and processing equipment. The reference point displayed on the screen is corrected based upon the time vs. drift parameters (However, depending upon the characteristics of the particular gyroscope employed, drift from internal friction in the gyroscope itself may exceed any drift due to earth rotation).

The two video systems enclosed in the lower portion of the tool are specially designed high resolution black and white or color video system for down hole use. The tool's depth capacity is 10,000 feet with a 2.150 inch outer-diameter for black and white and a 3.5 inch outer diameter for color. The array of cables exposed at the end of the housing 50 are coaxial cables for the camera, and also a power supply cord for the camera and light source 60. These cables 48 connect with the electronic components enclosed in the second housing 32.

The greater resolution of the break in a casing in a bore hole provided by the side scan video camera 200 allows the user to give a more informed opinion on the extent of damage to the casing, whether it is repairable, and how best to repair the fracture or break. The side scan video camera 200 image on the video monitor, FIG. 5, above ground has a floating directional reference point 73 displayed. The reference point is displayed and interpreted somewhat differently from the reference point 66 of FIG. 10 displayed on the monitor from the wide angle lens, because with the side scan video camera only about 50 degrees of the side wall is visible at a time in the image and because the image shows the side wall from a horizontal perspective rather than from a vertical head-first perspective. The dot indicates the direction of the portion of the side wall being viewed. The top of the screen is north, the bottom of the screen is south, the left of the screen is west, and the right of the screen is east. The rectangular video screen should be viewed as if it were a 360 degrees compass, with 12 o'clock, being due north, 3 o'clock being due east, 6 o'clock being due south, and 9 o'clock being due west. The directional reference point will change position in a circle fashion as the tool is rotated by the operator above ground. The dot will move to correspond with the imaginary clock positions. For example, if the dot is at the bottom of the video screen, the image on the screen shows the due south portion of the side wall. The gyroscope and the side scan video camera move together. They are synchronized with each other.

Figures 6, 7:
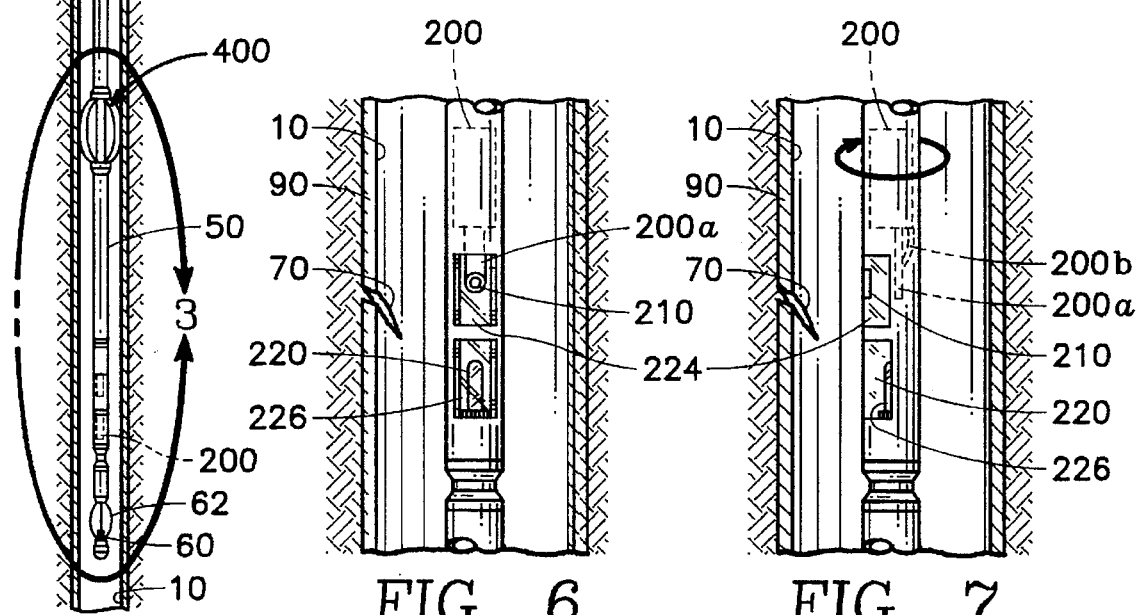
FIG. 6 illustrates an alternate embodiment of the side scan video camera. In this alternate, the angled mirror is eliminated and the side scan video camera and its lens are side-mounted so that the camera is looking directly at the side wall. The lens can be equipped with a power zoom and iris adjustment to compensate for large or small diameter bore holes. These features can be controlled from above ground. The iris adjustment adjusts the amount of light being picked up by the camera.
FIG. 7 illustrates the side view of the side-mounted video camera illustrated in FIG. 6 and the rotational ability of the tool.
Figure 8:
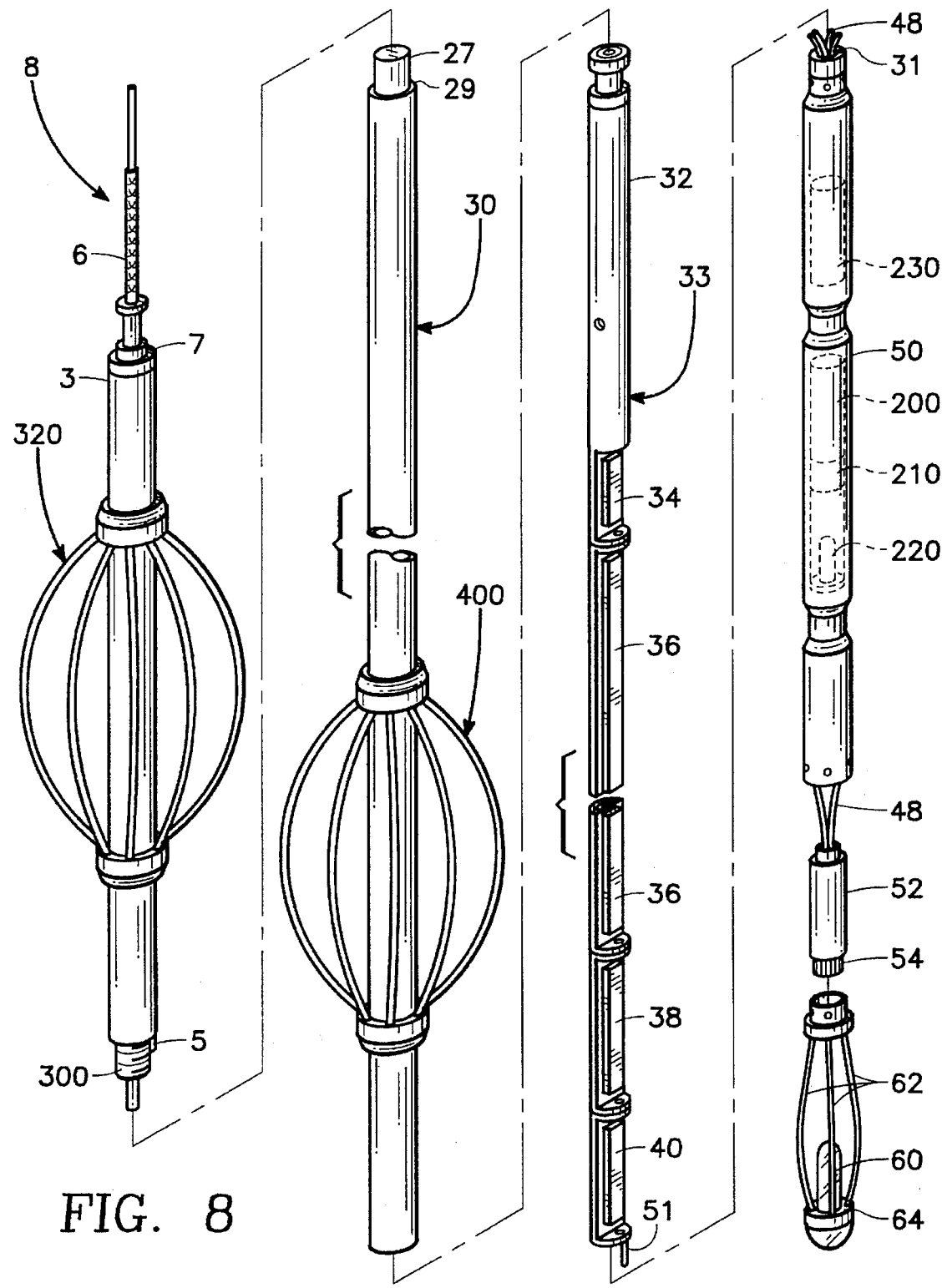
FIG. 8 illustrates the video tool in an exploded view. The upper section is rotatably attached to the cable head. The upper section houses the gyroscope, gyro-data interface, power supply/triplexer, telemetry board, and video amplifier transmission board. The wide angle video camera and the side mounted video camera are in the lower section along with their respective adjacent light sources. The upper and lower sections are for ease in transporting the tool to the job site. The upper and lower sections could be one piece if desired.

The side-mounted side scan video camera is shown in FIGS. 6 and 7. The camera 200 and the lens 210 are to be pointed directly at the side wall. This minimizes any distortion. Also it eliminates the reverse imaging problems caused by the reflective mirror of the embodiment of FIG. 4. In the embodiment of FIGS. 6 and 7, the side scan video camera 200 is side mounted. Specifically, the side scan video camera 200 includes a side mounted sensor circuit board 200a supporting a planar image sensor (such as a CCD integrated circuit) facing the lens 210 and a side window 224 in the housing. The sensor circuit 200a may be connected to the other circuits of the side scan video camera 200 via a ribbon cable 200b. The lens can also have a power zoom feature to refocus the lens to compensate for varying diameter bore holes. This eliminates the need to place a particular focus lens before starting the survey operation. An additional option on the camera lens is an aperture control for the iris to control the amount of light being picked up by the camera. Occasionally, the light from the light source 220 floods out the image. The iris control can correct this problem whenever it is encountered. A quartz window 224 seals and protects the lens compartment from the elements encountered in the bore hole. The light source 220 is protected by a quartz dome 226. The lower portion of the tool as illustrated in FIGS. 3, 4 and 8 shows segments coupled together. The bottom segment 440 contains the wide angle camera and light source. The middle segment 450 contains the side scan camera 200 and light source 220. The segments are for convenience so that they can easily be separated for maintenance or repair. However, the entire tool could be a one piece tubing if desired.

In the embodiment of FIGS. 3 and 4, the image sensor of the side scan camera 200 and the lens 210 both face down hole rather than sideways, so that a 45-degree angled reflective mirror 215 is required to provide a side view to the lens 210 and camera 200. Alternatively, the angled reflective mirror 215 could be replaced by a periscope-shaped lens.

A flux gate north directional seeker could be substituted for the gyroscope. An inclinometer could be attached to the tool to get directional slope of the bore hole. Usually, however, the bore hole to be surveyed and video logged, has already been logged with an inclinometer, and the data is used in conjunction with the video logging.

Obviously, many modifications and variations of the present invention are possible in light of the above teachings. It is therefore to be understood that the full scope of the invention is not limited to the details disclosed herein, but may be practiced otherwise than as specifically described.

What is claimed is:

1. A down hole video tool for inspecting the interior of a bore hole using a suspension cable for suspending said tool in said bore hole, said suspension cable being capable of supporting said tool, carrying signals and carrying electrical power, said tool comprising:

a connection portion for attachment to said suspension cable to suspend said tool in said hole;

a rotatable housing rotatably attached to said connection portion at one end of said rotatable housing;

a down hole video camera in said rotatable housing adapted to produce down hole video images for transmission as video signals from said tool through said cable;

a side scan video camera in said rotatable housing adapted to produce side scan video images for transmission as video signals from said tool through said cable;

at least one light source in said rotatable housing adapted to receive electrical power transmitted to said tool through said cable; and a rotation actuator for rotating said rotatable housing relative to said upper housing so as to scan said side scan video camera, said rotation actuator adapted to receive electrical power transmitted to said tool through said cable.

2. The tool of claim 1 wherein said down hole video camera has a field of view generally directed down said bore hole along a longitudinal axis of said bore hole while said side scan video camera has a field of view directed generally transverse to said longitudinal axis of said bore hole, and wherein the axis of rotation of said rotatable housing is generally parallel to said longitudinal axis.

3. The tool of claim 2 wherein said field of view of said side scan video camera is generally orthogonal to said longitudinal axis of said bore hole.

4. The tool of claim 1 further comprising:

an upper centralizer on said connection portion for positioning said connection portion in said hole;

a lower centralizer on said rotatable housing for positioning said rotatable housing in said hole; and bearings between said lower centralizer and said rotatable housing for permitting rotation of said rotatable housing relative to said lower centralizer and relative to said connection portion.

5. The tool of claim 1 wherein said rotation actuator is energizable for initiating rotation of said rotatable housing whenever it is desired to rotate said rotatable housing.

6. The tool of claim 3 wherein said upper and lower centralizers are expandable whenever it is desired to stabilize said tool and retractable whenever it is desired to move said tool.

7. The tool of claim 2 wherein said field of view of said down hole video camera has a wider angle than the field of said side scan video camera.

8. The tool of claim 7 wherein said side scan video camera provides a higher resolution image of a side wall of said bore hole than said down hole video camera.

9. The tool of claim 1 further comprising a direction sensor in said rotatable housing, said direction sensor being adapted to produce an output representative of an orientation of said rotatable housing for transmission as a data signal from said tool through said cable.

10. The tool of claim 9 further comprising a video circuit board in said rotatable housing for producing said video signals from the video images of at least a selected one of said down hole and side scan video cameras.

11. The tool of claim 10 a power circuit board for conditioning electrical power received through said cable for use by said down hole video camera and side scan video camera.

12. The tool of claim 11 further comprising a data circuit board for converting said output of said direction sensor to said data signal for use in displaying a representation of said output of said direction sensor with a video image from at least a selected one of (a) said side scan video camera and (b) said down hole video camera.

13. The tool of claim 1 wherein said one light source is adapted to illuminate the field of view of said down hole video camera, said down hole video tool further comprising another light source adapted to illuminate the field of view of said side scan video camera.

14. The tool of claim 1 further comprising a side facing window in said rotatable housing for said side scan video camera.

15. The tool of claim 14 wherein said side scan video camera is side mounted in said rotatable housing.

16. The tool of claim 14 wherein said side scan video camera comprises an image sensor facing down hole and an angled reflective mirror providing an optical path from said down hole facing image sensor of said side scan video camera through said side facing window.

17. The tool of claim 1 further comprising a down hole facing window in the down hole end of said tool, wherein said down hole video camera comprises an image sensor facing down hole through said down hole facing window.

18. The tool of claim 12 wherein said rotatable housing comprises an upper portion and a lower portion, said video circuit board, said power circuit board and said gyro board residing in said upper portion of said rotatable housing, and said down hole video camera and said side scan video camera reside in said lower portion of said rotatable housing.

19. A tool for inspecting the interior of a passage, said tool adapted to be inserted into said passage in the direction of a longitudinal axis of said tool, said tool comprising:
a head portion for supporting said tool in said passage;
a rotatable housing rotatably attached to said head portion at one end of said rotatable housing;
an axial camera in said rotatable housing having a longitudinal view facing generally along a longitudinal axis of said tool and adapted to produce images for transmission as video signals from said tool through said head portion;
a transverse camera in said rotatable housing having a transverse view facing generally transverse to said longitudinal axis of said tool and adapted to produce images for transmission as video signals from said tool through said head portion; and
a rotation actuator for rotating said rotatable housing relative to said upper housing so as to scan said transverse camera.

20. The tool of claim 19 further comprising at least one light source in said rotatable housing.

21. The tool of claim 20 wherein said axial camera, said transverse camera, said light source and said rotation actuator are each electrically energized through said head portion.

22. The tool of claim 19 wherein said field of view of said transverse camera is generally orthogonal to said longitudinal axis of said passage.

23. The tool of claim 19 further comprising:
an upper centralizer on said head portion for positioning said head portion in said hole;
a lower centralizer on said rotatable housing for positioning said rotatable housing in said hole; and
bearings between said lower centralizer and said rotatable housing for permitting rotation of said rotatable housing relative to said lower centralizer and relative to said head portion.

24. The tool of claim 19 wherein said rotation actuator is energizable for initiating rotation of said rotatable housing whenever it is desired to rotate said rotatable housing.

25. The tool of claim 23 wherein said upper and lower centralizers are expandable whenever it is desired to stabilize said tool and retractable whenever it is desired to move said tool.

26. The tool of claim 23 further comprising a direction sensor in said rotatable housing, said direction sensor being adapted to produce an output representative of an orientation of said rotatable housing for transmission as a data signal from said tool through said head portion.

27. The tool of claim 26 further comprising a data circuit board for converting said output of said direction sensor to said data signal for use in displaying a representation of said output of said direction sensor with a video image from at least a selected one of (a) said axial video camera and (b) said transverse video camera.

28. A down hole video inspection system for inspecting the interior of a bore hole, said system comprising:
(a) a vehicle having a controllable winch, a power supply proximal said vehicle, a video monitor proximal said vehicle, processing circuits proximal said vehicle connected to said video monitor and a terminal proximal said vehicle for entering control commands;
(b) a suspension cable connected to said winch, said suspension cable being capable of carrying signals to and from said processing circuits and carrying electrical power from said power supply; and
(c) a down hole video tool comprising:
(1) a connection portion for attachment to said suspension cable to suspend said tool, whereby said winch controls the position of said tool in said hole;
(2) a rotatable housing rotatably attached to said connection portion at one end of said rotatable housing;
(3) a down hole video camera in said rotatable housing adapted to produce down hole video images for transmission as video signals from said tool through said cable to said processing circuits for display on said monitor;
(4) a side scan video camera in said rotatable housing adapted to produce side scan video images for transmission as video signals from said tool through said cable to said processing circuits for display on said monitor;
(5) at least one light source in said rotatable housing adapted to receive electrical power transmitted to said tool through said cable from said power supply;
(6) a rotation actuator for rotating said rotatable housing relative to said upper housing so as to scan said side scan video camera, said rotation actuator adapted to receive electrical power transmitted to said tool through said cable.

29. The system of claim 28 wherein said down hole video camera has a field of view generally directed down said bore hole along a longitudinal axis of said bore hole while said side scan video camera has a field of view directed sideways relative to said bore hole and generally transverse to said longitudinal axis of said bore hole and is a high resolution camera.

30. The system of claim 28 further comprising:

an upper centralizer on said connection portion for positioning said connection portion in said hole;

a lower centralizer on said rotatable housing for positioning said rotatable housing in said hole; and bearings between said lower centralizer and said rotatable housing for permitting rotation of said rotatable housing relative to said lower centralizer and relative to said connection portion.

31. The system of claim 28 further comprising a direction sensor in said rotatable housing, said direction sensor being adapted to produce an output representative of an orientation of said rotatable housing for transmission as a data signal from said tool through said cable to said processing circuits for displaying orientation of said tool on said monitor with a video image from at least a selected one of (a) said down hole video camera and (b) said side scan video camera.

* * * * *

UNITED STATES PATENT AND TRADEMARK OFFICE
CERTIFICATE OF CORRECTION

PATENT NO. : 5,652,617
DATED : July 29, 1997
INVENTOR(S) : Barbour

It is certified that error appears in the above-indentified patent and that said Letters Patent is hereby corrected as shown below:

Column 1, line 7 after "now abandoned" please insert --which is a continuation-in-part of application Serial No. 08/184,360, filed January 19, 1994 which is a continuation of application Serial No. 07/792,979, filed November 15, 1991--

On the title page of the patent under "Related U.S. Application Data" after the word "abandoned" please insert --which is a continuation-in-part of application Serial No. 08/184,360, filed January 19, 1994 which is a continuation of application Serial No. 07/792,979, filed November 15, 1991--

Signed and Sealed this

Thirtieth Day of September, 1997

Attest:

BRUCE LEHMAN

Attesting Officer

Commissioner of Patents and Trademarks